United States Patent [19]

Paules

[11] 4,015,546
[45] Apr. 5, 1977

[54] APPARATUS AND METHOD FOR CONVERTING REFUSE TO USEFUL ENERGY

[76] Inventor: Eugene H. Paules, 854 W. Broadway, Red Lion, Pa. 17356

[22] Filed: Oct. 9, 1975

[21] Appl. No.: 620,962

[52] U.S. Cl. .............................. 110/8 A; 110/8 P; 110/10; 110/28 F; 110/119; 110/15
[51] Int. Cl.² .......................................... F23G 5/04
[58] Field of Search ............ 110/8 R, 8 A, 8 P, 10, 110/15, 119, 8 C, 18 R, 18 C, 28 F; 122/2

[56] References Cited

UNITED STATES PATENTS

| | | | |
|---|---|---|---|
| 2,393,822 | 1/1946 | Schoenfeld | 110/56 |
| 2,723,651 | 11/1955 | Bliss | 110/56 |
| 3,323,475 | 6/1967 | Melgaard | 110/18 |
| 3,387,574 | 6/1968 | Mullen | 110/7 |
| 3,658,482 | 4/1972 | Evans et al. | 110/8 |
| 3,680,501 | 8/1972 | Szilagyi et al. | 110/10 |
| 3,734,036 | 5/1973 | Abos | 110/15 |
| 3,834,326 | 9/1974 | Sowards | 110/8 |
| 3,834,326 | 9/1974 | Sowards | 110/8 |
| 3,938,449 | 2/1976 | Frisz et al. | 110/8 |
| 3,939,781 | 2/1976 | Adams | 110/8 |

Primary Examiner—Kenneth W. Sprague
Attorney, Agent, or Firm—John W. Logan, Jr.

[57] ABSTRACT

The preferred embodiment of the invention disclosed herein includes apparatus for and the steps of separating glass, metal and other generally non-combustible material from refuse to provide a volume of generally combustible refuse, shredding the volume of combustible refuse into relatively small particles and mixing the particles with primary combustion air, which is used to convey the particles to a combustion chamber. Auxiliary burners are used to heat the combustion chamber to a predetermined temperature above which the particles are self-igniting and use of the burners is thereafter discontinued unless the temperature falls below the predetermined temperature. The particles are separated as they are injected into the combustion chamber with a cyclonic motion. In the combustion chamber the mixture is ignited and converted to combustion gases which flow through the chamber. The flow of secondary air is regulated to provide maximum combustion temperature for the particles and negative pressure is maintained in the chamber to control the flow rate of the gases and to assure that the gases are generally completely combusted. The combusted gases are exhausted to an associated device such as a steam boiler or other device using the heat energy and thereafter are exhausted to the atmosphere.

39 Claims, 7 Drawing Figures

APPARATUS AND METHOD FOR CONVERTING REFUSE TO USEFUL ENERGY

This invention relates to a method and apparatus for converting refuse to useful energy and, more particularly, to a method and apparatus for burning refuse in a self-combusting process and providing relatively clean exhaust gases which can be utilized as a source of heat energy for various devices and discharged to the atmosphere in a generally harmless condition.

One of the problems becoming increasingly more acute relates to the disposal of ever-increasing amounts of refuse in a relatively clean manner; another of these problems relates to the provision of heat energy in a relatively economical manner. One desirable solution to both of these problems would be to dispose of the refuse in such a way that heat energy could be recovered during the disposal process and utilized for generating electricity, heating, and for other useful purposes. To date, no system attempting to accomplish these purposes has been entirely satisfactory. For example, some of the known systems burn a mixture of refuse and auxiliary fuel and utilize the resultant exhaust gases as a source of heat energy. However, use of the auxiliary fuel adds to the operational cost of the system, particularly in view of the increasing cost of commonly used fuels. Other known systems burn the refuse in a self-sustaining combustion process and utilize the resultant exhaust gases as a source of heat energy. A major problem in both the auxiliary fuel and the self-sustaining systems results from the wide variations in the combustion temperature and heat value of the various types of refuse. To compensate, the refuse is burned with too little or, more usually, too much combustion air resulting in relatively low combustion temperatures. Because of the relatively low combustion temperatures, large amounts of uncombusted refuse, fly ash and other pollutants are discharged from the combustion chamber. Prior to discharge to the atmosphere, the uncombusted refuse, fly ash and other pollutants must be removed necessitating the use of expensive scrubbers and other apparatus. In addition, the low combustion temperatures provide a relatively inefficient source of heat energy.

Accordingly, it is an object of this invention to provide a system for and a method of disposing of refuse and providing useful energy in an efficient and economical manner.

It is another object of this invention to provide an incinerator for burning refuse in an efficient manner so that complete combustion occurs.

It is yet another object of this invention to provide a method and apparatus for controlling combustion temperatures in an incinerator whereby refuse is burned at its maximum temperature.

Finally, it is an object of this invention to provide a system for and a method of disposing of refuse in a self-sustaining combustion process that produces minimal fly ash and air pollutants and utilizing the exhaust gases as a source of useful heat energy before discharge to the atmosphere.

These and other objects of this invention are accomplished by apparatus for and in a method including the steps of separating glass, metals and other non-combustibles from the refuse leaving a volume of generally combustible refuse, shredding the combustible refuse into relatively small size particles, mixing the particles with primary combustion air and injecting the mixture into a heated combustion chamber. As the mixture is injected into the combustion chamber the refuse particles are separated and the mixture assumes a cyclonic motion. After the mixture enters the combustion chamber, it ignites and is converted to combustion gases which continue to flow through the chamber with the generally cyclonic motion. Also included is apparatus for and the steps of controlling the flow of secondary combustion air to the combustion chamber to provide maximum combustion temperatures and controlling the flow rate of the gases through the combustion chamber so that generally complete combustion occurs.

In the preferred embodiment of the invention disclosed herein, the combusted gases from the combustion chamber are used to dry the refuse prior to its injection into the combustion chamber so that the moisture content is reduced to preferably no more than 5%. Also, in the preferred embodiment of the invention disclosed herein the primary combustion air injected into the combustion chamber with the particles of refuse comprises no more than about two-thirds of the air required for complete combustion and is preheated along with the particles prior to injection. The secondary combustion air is also preferably preheated prior to its injection into the combustion chamber and in the preferred embodiment of the invention disclosed herein, this air is heated by combustion gases in the combustion chamber. Excess secondary combustion air, that is, air not required for combustion is used to make up some of the primary combustion air and, thus, provides preheating of the mixture.

Apparatus operating in accordance with the above method is generally conventional except for the combustion chamber which preferably includes a primary and a second combustion chamber. The primary combustion chamber is formed by a generally cylindrical member and is provided with at least one and preferably two injection nozzles for the mixture of refuse and air tangentially disposed at one end of the combustion chamber so that the mixture assumes the cyclonic flow path through the chamber. The nozzles include a plurality of vanes forming channels of a predetermined width for separating the particles as they are injected into the chamber so that the refuse particles are fully mixed with the air. A heat exchanger for secondary combustion air is provided in heat exchange relationship with the combustion chamber and one embodiment is centrally disposed in the combustion chamber, is formed with an air inlet at one end for the secondary combustion air and is also formed with an air outlet at the other end which communicates through a secondary air plenum with a plurality of discharge tubes in communication with the combustion chamber. In another embodiment the heat exchanger is disposed about the cylindrical member, is formed with an air inlet opening at one end and an air discharge opening at the other. In this embodiment the discharge tubes communicate between the heat exchanger and the combustion chamber. In both embodiments a discharge opening is located at the other end of the combustion for discharging combustion gases from the combustion chamber.

From the primary combustion chamber the combustion gases which are generally completely combusted, are discharged to the secondary combustion chamber which is formed by a generally cylindrical portion extending about a discharge flue to form a flow chamber which receives the combustion gases. At the lower end of the cylindrical portion is a generally frusto-conic portion forming a separation chamber having its larger end in communication with the flow chamber and the discharged flue. In addition a secondary air plenum may be formed about the frusto-conic portion and communicates with the separation chamber for providing secondary air required for combustion. The combustion gases flow with a relatively high velocity in a spiral path in the flow chamber to the separating chamber and reverse to flow vertically through the discharge flue with a relatively low velocity so that non-combustibles are separated. Thus, the non-combustions are not discharged with the combustible gases.

As noted previously the flow of secondary combustion air to the combustion chamber is controlled to provide maximum combustion temperatures. In accordance with this invention there is provided apparatus for and a method including the steps of changing the flow of secondary combustion air by increasing or decreasing the flow, determining temperature changes in the combustion chamber and changing the flow in accordance with the temperature changes by continuing the most recent change in flow if the temperature has increased or by reversing the most recent change in flow if the temperature has decreased.

For a better understanding of the invention, reference is made to the following description of a preferred embodiment thereof taken in conjunction with the figures of the accompanying drawing, in which.

Figure 1:
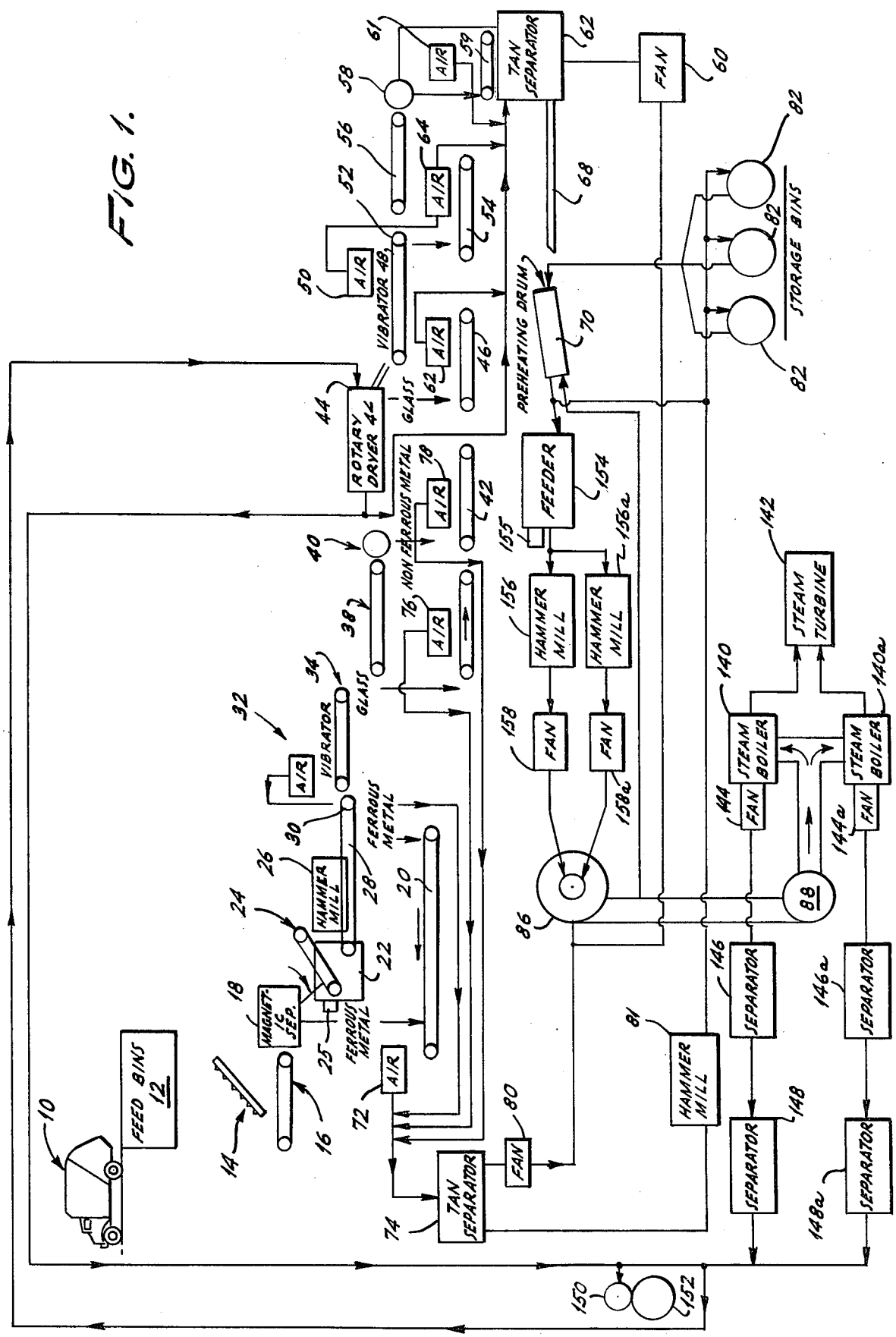
FIG. 1 is a schematic illustration of a system in accordance with this invention for performing a method also in accordance with this invention.
Figure 2:
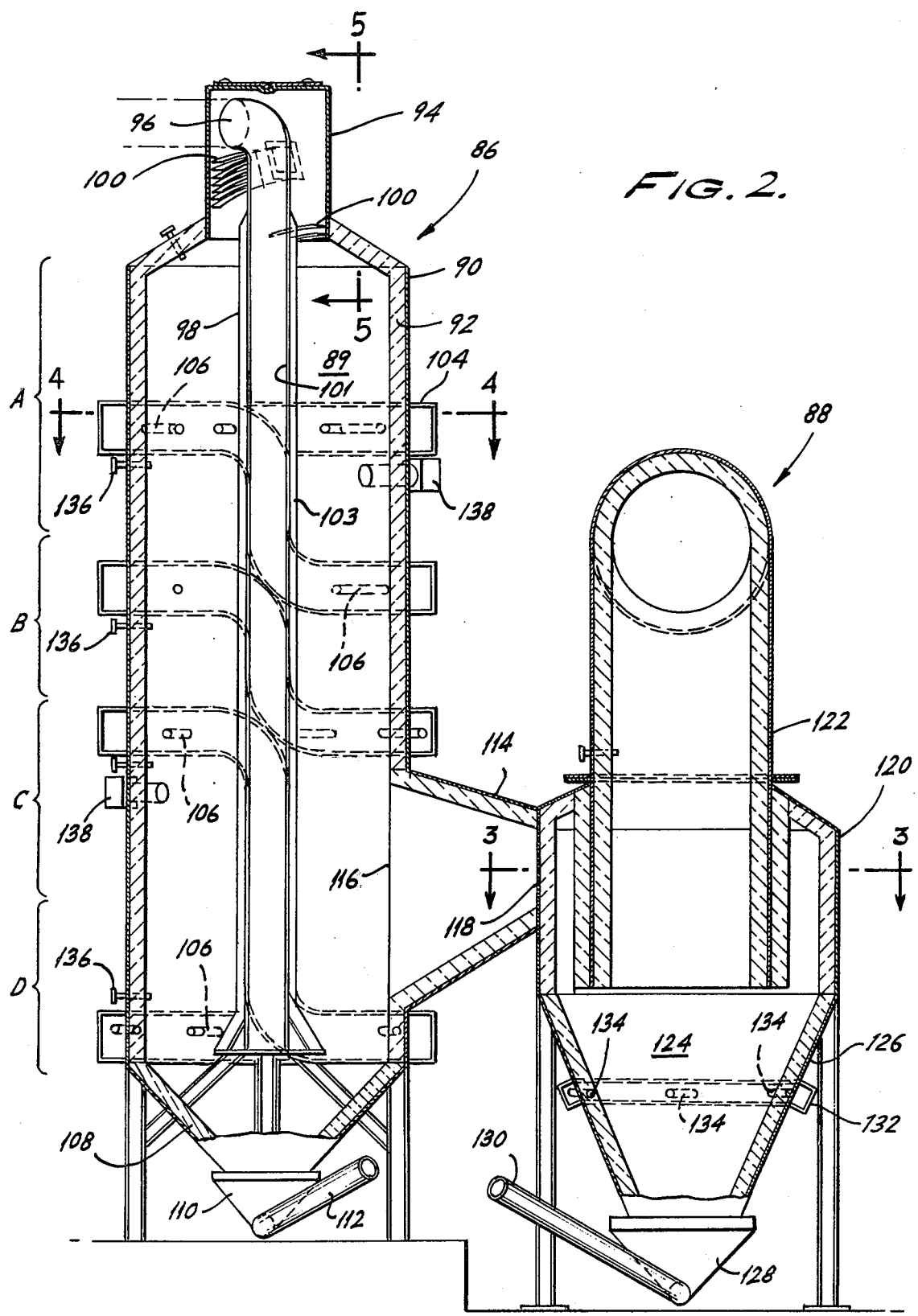
FIG. 2 is a sectional view of one embodiment of an incineration system usable in the systems illustrated in FIG. 1.
Figure 3:
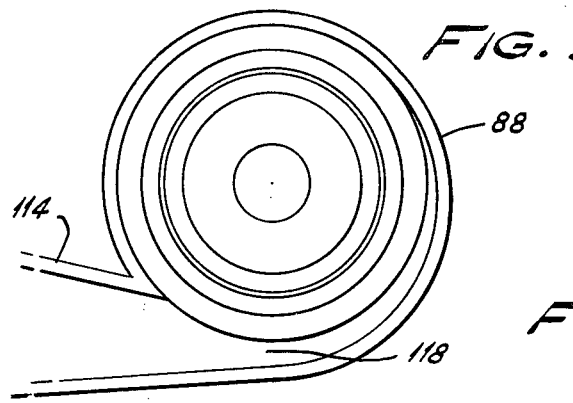
Figure 4:
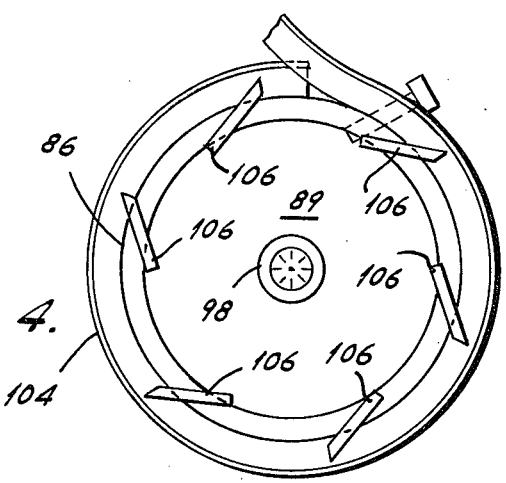
Figure 5:
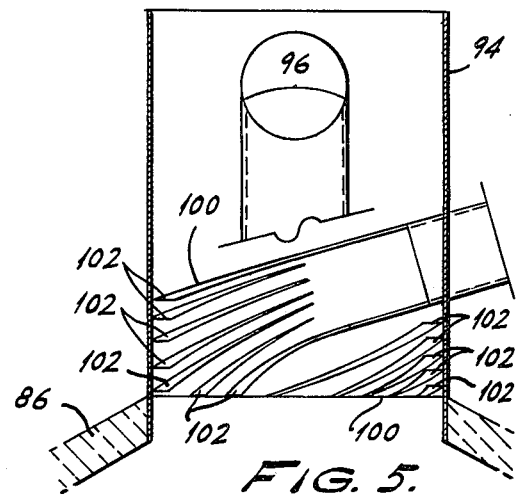
Figure 7:
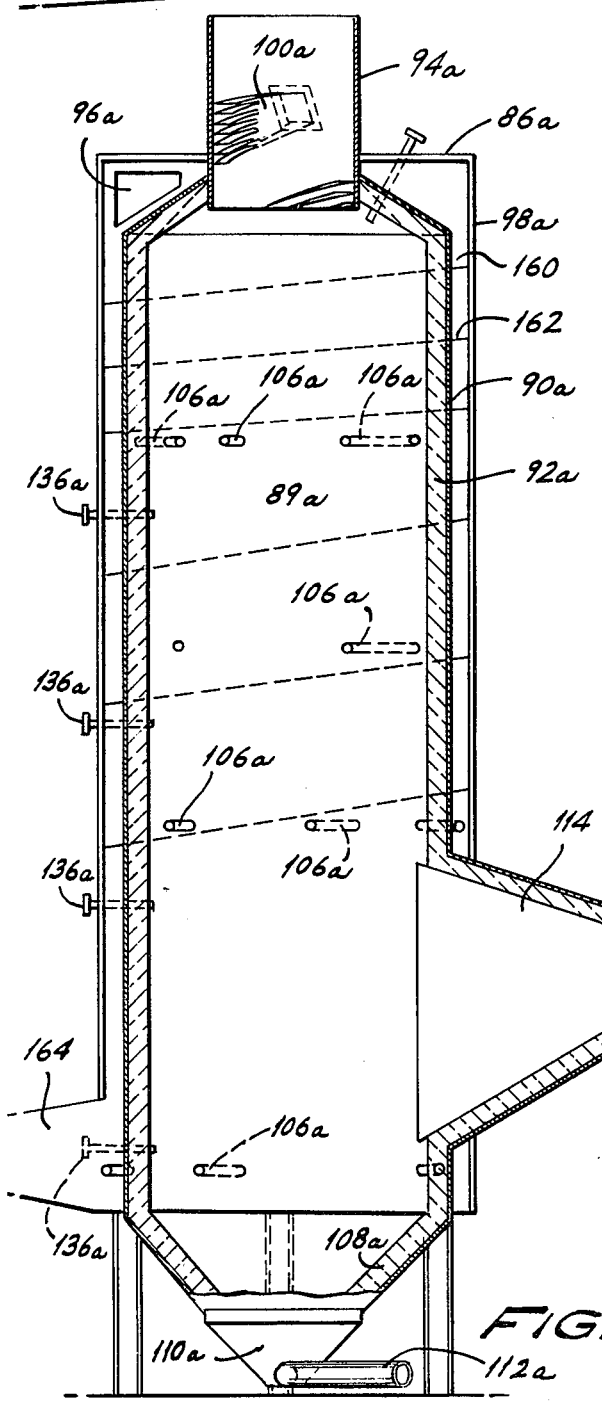
Figure 6:
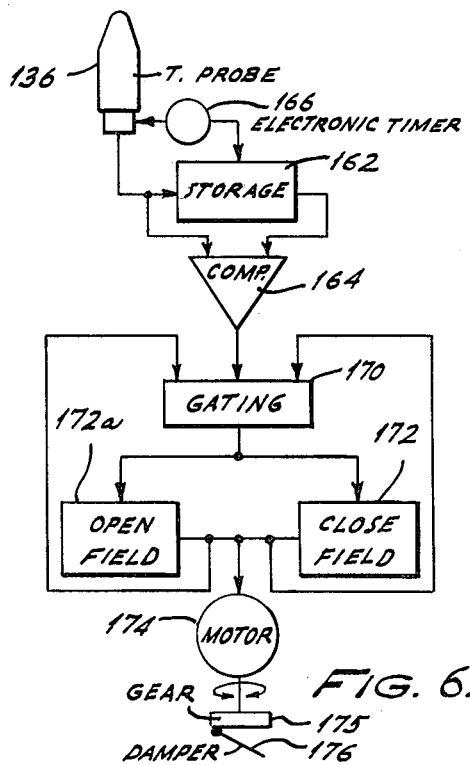

FIGS. 3, 4 and 5 are sectional views of the apparatus illustrated in FIG. 2 of the drawing and taken generally along the lines 3—3, 4—4 and 5—5 thereof, respectively;

FIG. 6 is a schematic illustration of apparatus for controlling the temperature in a combustion chamber in accordance with this invention; and FIG. 7 is a sectional view of a modified form of an incineration system usable in the system illustrated in FIG. 1.

Referring first to FIG. 1 of the drawing, both the arrangement of apparatus comprising a system in accordance with this invention and a method in accordance with this invention will be explained. Refuse including industrial, municipal and other types of waste is collected and transported in trucks 10 to a feed bin 12 where the refuse is deposited. The feed bin 12 may include a series of parallel conveyors each adapted to receive refuse from a truck and to transport the refuse through an associated carton breaker 14 (only one of which is illustrated) to a commmon conveyor 16. Each carton breaker 14 may include a crankshaft carrying a plurality, preferably several pairs, of parallel breaker bars formed with teeth (as illustrated) so that as the refuse is fed between the breaker bars, the teeth are operative to break or tear open cartons, bags and other closures in which the refuse is contained. From the conveyor 16, the refuse is transported through a first magnetic separator 18 which separates a significant amount of the ferrous material and deposits this material on a conveyor 20. After passing the magnetic separator 18, the remaining refuse is deposited into a feed hopper 22 a conveyor 24 associated with it for feeding refuse from the hopper to the remainder of the separating apparatus.

At this point it is noted that a photoelectric cell 25 is associated with the feed hopper 22 for monitoring the level of refuse in the hopper and controlling the speed of the conveyors in the feed bin 12 so that a substantially constant level of refuse is maintained in the feed hoppers. The speed of the conveyor 24 is controlled in accordance with the load on a hammer mill 26 to which the refuse is fed and/or by the moisture content of the refuse. With the arrangement described, the flow of refuse can be maintained at a predetermined, but adjustable, rate. The hammer mill 26 is operative to reduce the refuse passing therethrough to particles having a size of about 4 inches to 5 inches. The refuse particles are discharged from the hammer mill 26 onto a conveyor 28 including a magnetic drive pulley 30 for separating additional ferrous material from the refuse and for depositing the separated ferrous material on the conveyor 20. At the discharge end of the conveyor 28 is located an air leg separator 32 in the form of an air suction apparatus which separates some light-weight combustible particles from the refuse. From the conveyor 28 the refuse is deposited onto a vibrating screen conveyor 34 which separates glass and other non-combustibles from the refuse and deposits these materials on a conveyor 36. The remaining generally combustible refuse is carried by a high speed conveyor 38 which feeds the refuse through an inertial separator 40 for separating non-ferrous metal and other non-combustibles and deposits it on a conveyor 42. The remaining generally combustible refuse is then discharged into a rotary dryer 44.

As will be made clearer hereinafter, the rotary dryer 44 receives, at its discharge end, hot exhaust gases from a refuse combustion process and these gases are fed through the dryer in a direction opposite the direction of travel of the refuse to dry the refuse and reduce its moisture content. Preferably, the amount of exhaust gases fed through the dryer is controlled in accordance with the moisture content of the refuse being fed to the dryer such that all of the moisture is removed. As an outer limit, the moisture content of the refuse should be no more than about 5% for maximum energy recovery. The reduction in the moisture content results in a significant increase in the BTU value of the refuse which, of course, significantly increases the heat output of the system. The rotary member inside the dryer is preferably in the form of a perforated drum in which the refuse is tumbled in the presence of the hot exhaust gases. Because of the perforations glass and other non-combustibles are separated, and are deposited on a conveyor 46. The remaining refuse is discharged from the dryer 44 to a vibrating conveyor 48 which distributes the refuse into a thin layer and passes under an air separator 50 that separates the lightest dry particles of refuse. A magnetic separator 52 is located on the discharge side of the vibrating conveyor 48 and separates additional ferrous material from the refuse which is discharged onto a conveyor 54. From the vibrating conveyor 48 the remaining combustible refuse is fed through another high speed conveyor 56 and discharged to an inertial separator 58 which makes a final separation of ferrous materials from the refuse which is deposited on a conveyor 59 which carries the material under another air separator 61 for removing light combustible particles. The generally combustible refuse is discharged from the inertial separator 58 to a tangential separator 62.

In addition to the refuse from the inertial separator 58 which is comprised almost entirely of generally combustible refuse, the tangential separator 62 also receives some of the exhaust gases discharged from the rotary dryer 44 which gases may contain some noncombusted particles and/or particles of combustible material; combustible refuse from an air separator 62 which is located above the conveyor 46 and which separates light combustible particles of refuse from the glass discharged from the dryer; combustible refuse from an air separator 64 which is located over the conveyor 54 and which separates light combustible particles of refuse from the ferrous material separated by the magnetic separator 52; and, refuse from the air separator 50. A blower 60 pulls the particles through the air separators 50, 61, 62 and 64. A high speed conveyor 68 carries the particles of combustible refuse from the tangential separator 62, to a preheating drum 70 which, as will be made clear hereinafter, receives hot air not utilized in the combustion process.

As noted previously, ferrous material is collected on a conveyor 20 over which is located an air leg separator 72 which separates light particles of combustible refuse and feeds it to another tangential separator 74. In addition, the tangential separator 74 receives light particles of combustible refuse from the air leg separator 32 located over the vibrator 42; light particles of combustible refuse picked up by another air leg separator 76 located over the conveyor 36 which separates the particles from the glass separated by the vibrator 34; and, light particles of combustible refuse picked up by another air leg separator 78 located over the conveyor 40 and which also separates the particles from the non-ferrous metal separated by the inertial separator 40. Thus, it can be seen that all of the dried refuse is fed to the tangential separator 62 and all of the refuse accumulated prior to drying is fed to the tangential separator 74. A blower 80 pulls the particles through the air separators 32, 72, 76 and 78. The combustible refuse is discharged from the tangential separator 74 to a hammer mill 80 where it is shredded into particles having a size of about 3 inches or less. From the hammer mill 81 these particles are discharged to one or preferably more storage bins 82 for later use in the combustion process.

Referring to FIGS. 2 through 5, an incinerator system in accordance with the invention will be explained before proceeding with a further explanation of the system and method in accordance with this invention. The incinerator system preferably includes a primary incinerator 86 and a secondary or separating incinerator 88 arranged to receive combustion gases from the primary incinerator. The primary incinerator 86 is in the form of a generally cylindrical member providing a primary combustion chamber 89 oriented with its longitudinal axis in a generally vertical attitude. Other orientations, of course, can be provided, but the vertical orientation is preferred since it provides for a more efficient combustion process. The cylindrical member can include an outer metal shell 90 lined along its inner surface with refractory brick 92 or other suitable insulation which functions to minimize heat loss through the metal shell. The upper or inlet end of the combustion chamber 89 includes a tapered wall portion on which is located a cylindrical housing 94 formed with an air inlet 96 communicating downwardly through a heat exchanger 98 disposed generally along the longitudinal axis of the combustion chamber 89 and extending throughout the entire length thereof. In addition, the housing 94 carries a pair of refuse injection nozzles 100 located 180° apart and tangentially oriented with respect to the circular portion of the housing. These nozzles 100 more clearly seen in FIG. 5, are formed with a plurality of parallel separating vanes 102 also tangentially oriented with respect to the housing 94 and extending at an angle slightly downwardly toward the interior of the primary combustion chamber 89. These vanes 102 form a plurality of parallel channels through which the refuse travels so that the refuse particles are separated from each other and thoroughly mixed with the air conveying the particles and also functioning as primary combustion air. The tangential orientation functions to impact a cyclonic motion to the mixture as it is injected into the primary combustion chamber.

As noted previously, a heat exchanger 98 extends downwardly along the longitudinal axis of the primary combustion chamber and it is now noted that the heat exchanger comprises a conduit member 101 the outer surface of which is lined with fire brick 103 or other suitable insulation to control the amount of heat transferred from the primary combustion chamber to air flowing through the conduit. Adjacent the lower or discharge end of the combustion chamber the heat exchanger 98 communicates with a secondary air plenum 104 which extends around the outer periphery of the metal shell 90 in a generally spiral path. Referring briefly to FIG. 4 of the drawing, it can be seen that the secondary air plenum 104 is formed with a plurality of generally tangentially oriented discharge tubes 106 communicating between the secondary air plenum and the primary combustion chamber 89. Thus, secondary air discharged into the inlet opening 96 is heated in the heat exchanger 98, discharged into the secondary air plenum 104, and finally through the distance tubes 106 into the combustion chamber 89 to control the temperature of the combustion process. The control function will be fully explained hereinafter.

At the lower or discharge end of the combustion chamber 89 there is provided a tapering conical portion 108 constructed of generally the same materials as the primary combustion chamber and having a discharge opening associated with a water lock 110 and a screw conveyor 112. This arrangement provides for the automatic removal of any molten slag formed during the combustion process or any non-combustible refuse fed to the combustion chamber 98 which will settle and accumulate in the conical portion 108 and pass through the water lock 110 to the screw conveyor 112 and a suitable accumulating device. The material discharged from the screw conveyor is sterile and can be used for road ballast or landfill without any contamination.

In a lower portion of the primary combustion chamber 89 is a tangential discharge throat 114 constructed of generally the same materials as the primary combustion chamber. The discharge throat 114 tapers from a large discharge opening 116 communicating with the primary combustion chamber to a smaller discharge opening 118 tangentially oriented with respect to the separating incinerator 88. Still referring to FIG. 2, the separating incinerator 88 includes a generally cylindrical outer member 120 extending around a discharge flue 122 and spaced therefrom to provide an annular portion of a secondary combustion chamber 124. At the lower end of the cylindrical portion 120 is a frusto-conical tapering portion 126 providing a separating portion of the secondary combustion chamber. The lower end of the frusto-conical portion 126 is associated with a water seal 128 and a screw conveyor 130 for removing remaining non-combustibles from the gases. Extending about the frusto-conical portion 126 is a secondary air plenum 132 that also communicates with the heat exchanger 98 in the primary combustion chamber and which includes discharge tubes 134 extending tangentially into communication with the secondary combustion chamber so that secondary combustion air can also be fed to the secondary combustion chamber.

Each of the discharge tubes 106 and 134 is provided with an automatically controlled damper (not shown in FIG. 2) which opens and closes to regulate the amount of secondary air fed to the combustion chamber in accordance with the temperature therein. Accordingly, temperature probes 136 are associated with both te primary combustion chamber 89 and the secondary combustion chamber 124. The primary combustion chamber 89 also includes a plurality of auxiliary burners 138 spaced about the periphery thereof for a purpose to be explained hereinafter.

Referring back to FIG. 1, it can be seen that the discharge flue 122 of the separating incinerator 88 communicates with a pair of steam boilers 140 and 140a. The boilers 140 and 140a utilize the heat provided by the combustion gases discharged from the separating incinerator 88 to provide steam to drive the steam turbine 142. Suitable dampers (not shown) are provided between the secondary incinerator 88 and the steam boilers 140 and 140a so that either or both of the boilers may be used depending on the requirements of the steam turbine 142. The steam boilers 140 and 140a are associated with exhaust fans 144 and 144a, respectively, operative to maintain a substantially constant negative pressure, that is, a pressure less than atmospheric, in the incinerators 86 and 88. Thus, a draft across the combustion chambers is provided that pulls the exhaust gases from the combustion chambers through the steam boilers at a controlled rate. From the steam boilers 140 and 140a the gases pass through separators 146 and 146a, respectively, to secondary separators 148 and 148a, respectively, and into a final separator 150 for final cleaning of the gases which are then discharged through a stack 152 to the atmosphere. As will be made clear, the exhaust gases are relatively clean when discharged from the separating incinerator and require no precipitators or scrubbers which adds to the economy of the system. Between the secondary separators 148 and 148a and the final separator 150, a portion of the exhaust gases are discharged through a control damper back to the rotary dryer 44 to provide for the drying of the refuse as explained heretofore. From the dryer 44 some of the gases are discharged back into the final separator 150 for the discharge to the atmosphere and by providing a scupper at the discharge of the dryer, a controlled amount of these gases including uncombustible particles are discharged back to the tangential separator 62 for recycling through the incinerators.

Secondary combustion air from the heat exchanger 98 not utilized in the combustion process is discharged to the preheating drum 70 to provide for initial heating of the refuse prior to feeding into the primary combustion chamber 86. The preheating drum 70 receives the dried light refuse particles from the tangential separator 62 and if additional refuse is required also from one of the stroage bins 82. In the preheating drum 70 the refuse and its conveying air is mixed with the heated air from the heat exchanger 98 so that the heated air increases the temperature of the mixture. From the preheating drum 70 the preheated mixture of air and refuse is discharged to a feeder 154, the level of refuse in the feeder being controlled by a conventional photoelectric cell 155 similar to photoelectric cell 25. The rate of discharge of the feeder is controlled by a conventional electronic weigh belt in accordance with the demand requirements of the steam boilers 140 and/or 140a so that a controlled amount of refuse is discharged from the feeder 154 into either or both of a pair of final hammer mills 156 and 156a associated with fans 158 and 158a, respectively. Excess refuse, that is refuse not needed in the feeder 154 is discharged back to the storage bins 82. The hammer mills 156 and 156a are operative to shred the refuse into particles of a size no greater than 1 inch. The fans 158 and 158a are operative to discharge the refuse and air through the injection nozzles 100 and into the primary combustion chamber 89. It is noted that the requirements of the steam boilers determine whether one or both of the hammer mills and its associated fan are utilized.

It can be seen that the feed to the incinerator 86 is a direct feed of dry light refuse accumulated or separated from the refuse after it passes the dryer and/or from refuse sorted prior to the drying process and stored in the storage bins 82 and it is noted that this refuse is relatively dry. When the system is initially started or when the temperature in the combustion chamber drops below about 1,500° F, the auxiliary burners 138 are operative to heat the primary combustion chamber. There are preferably three auxiliary burners which may be gas or oil fed. Initially the top burner is ignited and when a temperature of 500° is attained, the second burner is ignited; when a temperature of 1,000° F is attained the third burner is ignited. Use of the burners is discontinued when the temperature reaches about 1,800° F and is reinstituted if the temperature falls below about 1,500° F.

When the temperature in the primary combustion chamber reaches 1,600° F, either or both of the blowers 158 or 158a are activated to discharge the preheated mixture of air and small refuse particles through the injection nozzles 100. The air in this mixture provides about ⅔ of the air required for complete combustion and is considered to be the primary combustion air. The other ⅓ of the air required for complete combustion is supplied through the discharge tubes 106 and is considered to be the secondary combustion air. As the mixture is injected, the refuse particles are separated in the channels between the vanes 102 and flow with a cyclonic motion about the longitudinal wall of the combustion chamber 89. Upon entry into the primary combustion chamber 89, the particles of refuse ignite and are converted to primary combustion gases that continue to flow in the cyclonic path toward the discharge throat 144 under the influence of the draft caused by blowers 144 and/or 144a. The cyclonic path is maintained by the flow of secondary air which is also tangentially injected into the primary combustion chamber 89 through the tangentially disposed discharge tubes 106. In addition, the heat exchanger 98 located along the longitudinal axis of the primary combustion chamber helps maintain the cyclonic path of the combustion gases.

Relatively complete combustion of the refuse and gases occurs in the primary combustion chamber and the non-combustible refuse settle into the conical portion 108 of the incinerator 86 and through the water lock 110 to be discharged by the screw conveyor 112. The combustion gases are then discharged through the discharge throat 114 tangentially into the secondary chamber 124 and flow in a cyclonic path around the lower portion of the discharge flue 122 and into the separating portion of the chamber formed by frusto-conic portion 126 where additional secondary air can be mixed with the gases through discharge tubes 135 to assure complete combustion. The combustion gases then flow upwardly through the discharge flue 122 to the steam boilers 140 and 140a. Separation of non-combustibles occurs because of the downward flow of the gases in a cyclonic path and at a relatively high velocity, then the upward flow of the gases through the separating portion of the combustion chamber 124 and then the discharge flue 122 at a relatively low velocity. The separated non-combustibles settle downwardly through the water lock 128 and are discharged by the screw conveyor 130.

The exhaust air provided by blowers 60 and 80 associated with the tangential separators 62 and 74, respectively is utilized as the secondary combustion air and is discharged through the inlet opening 96 located in the housing 94 on the primary combustion chamber. This air flows through the heat exchanger 98 and is heated to a temperature of approximately 500° F by the combustion gases. The air is discharged into the secondary plenums 104 and 132 and excess air, that is, air not necessary to provide maximum combustion temperatures, is discharged to the preheating dum 70. The flow of secondary combustion air is periodically changed, that is periodically increased or decreased to accommodate the heat value of the refuse which changes according to the nature of the refuse. It is noted, that maximum combustion temperatures are obtained only when substantially the exact amount of combustion air is mixed with the refuse. Any excess or lack of air in the combustion chamber results in lower than maximum temperatures. Accordingly, the temperatures in the combustion chamber are continuously or preferably periodically sampled, for example, every 30 or 60 seconds the temperature in the combustion chamber is measured. A determination is made to see if the temperature has increased or decreased since the last measurement and the last change in the flow of secondary air is noted, that is, a determination is made whether the last change in flow was an increase or decrease. If the temperature has increased, the most recent change is continued and if the temperature has decreased, the most recent change is reversed. For example, if the most recent change has been an increase in the flow of secondary air and the temperature has decreased, the flow of air is decreased. Continuing the example, if the most recent change has been a decrease in the flow of secondary air and the temperature has increased, the flow of air is again decreased; if, however, the temperature has decreased, the flow of air is increased. Since the temperature in the primary combustion chamber is not constant throughout and since different types of refuse may be combusted in different sections of the primary combustion chamber 89 it has been found desirable to divide the primary combustion chamber into a plurality of zones, noted on the drawing as A, B, C, and D. Each zone is associated with a plurality of discharge tubes 106 and each of the tubes includes an associated damper. Temperatures are monitored in each zone by the temperature probe 136 associated with a particular zone and the dampers in the discharge tubes 106 associated with the particular zone are adjusted independent of the dampers in the other zones to control the flow of secondary combustion air. Since the size of the secondary combustion chamber 124 is relatively small it may be considered as a single zone and will include one set of discharge tubes 134 with an associated temperature probe 136.

Referring to FIG. 6, a schematic illustration of a control system for accomplishing the temperatures control is disclosed. One temperature probe 136 is illustrated and is operative to determine the temperature in one zone of the combustion chamber and provide a signal indicative thereof. From the temperature probe 136, the signal is fed to a storage device 162 and to a comparator 164.

Periodic temperature measurements and signals from the storage device 162 are controlled by a clock 166 in the form of an electronic timer adjusted to provide the sampling at predetermined time intervals. When the clock 166 triggers the probe 136 and the storage device 162 an instantaneous temperature signal and previous temperature signal, stored in the storage device are fed to the comparator 164. The instantaneous temperature signal is also fed into the storage device 162 for retention until the clock again triggers it. The comparator 164 is a generally conventional device and may be in the form of a differential amplifier providing an output signal indicative of the difference between the instantaneous and previous temperature readings, that is, the change in temperature. From the comparator 164 the signal representative of the temperaure change is fed to a suitable electronic gating system 170 which receives signals from a close or open field 172 or 172a, respectively, associated with a motor 174 that drives the gears 175 and dampers 176 in the discharge tubes 106. The motor is generally conventional and is capable of reversing and is thus provided with the close or open fields 172 and 172a. Depending upon the temperature differential signal and the signal received from either the closed or open fields which indicates previous movement of the damper and thus the most recent change in the flow of secondary combustion air, the gating system 170 provides an output signal to either the close or open field 172 or 172a, respectively, which continues the motor's movement in its previous direction or reverses that movement in accordance with the criteria explained with respect to the method. Preferably, the motor 174 is a stepper motor or similar motor which provides an output pulse when energized so that each movement of the dampers is a predetermined distance.

Referring to FIG. 7 of the drawing, a modified form of a primary incinerator 86a is illustrated and is generally similar to primary incinerator 86 illustrated in FIG. 2 of the drawing. Accordingly, like reference numerals will be utilized with the suffix a. The primary incinerator 86a is in the form of a generally cylindrical member forming a primary combustion chamber 89a and oriented with its longitudinal axis in a vertical plane. The cylindrical member includes an outer metal shell 90a lined along its inner surface with refractory brick 92a which has a reduced thickness relative to brick 92 disclosed with respect to primary incinerator 86. The thickness of brick 92a is such that a predetermined amount of heat is conducted through the metal shell 90a. At the upper or inlet end, the cylindrical member carries a cylindrical housing 94a including tangentially oriented injection nozzles 100a similar to nozzles 100. Adjacent the lower or discharge end of the primary combustion chamber there is provided a tapering conical portion 108a having a discharge opening associated with a water lock 110a and a screw conveyor 112a to provide for the automatic removal of any noncombustible refuse fed to the primary combustion chamber. Adjacent the conical portion 108a and a lower portion of the primary combustion chamber is a tangential discharge throat 114a similar to throat 114 communicating with the separating incinerator 88.

The primary incinerator 86a also includes a heat exchanger 98a which is located around the outer metal shell 90a to form a heat exchange channel 160 having an air inlet opening 96a communicating with the blowers 60 and 80. A spiral baffle 162 extends through the heat exchange channel 160 so that the air flow is in a spiral path around the combustion chamber. The baffle 162 initially forms a relatively small helix angle, that is, the angle with a horizontal plane, and the helix angle becomes larger and constant just below the first set of discharge tubes 106a. With this arrangement the retention time of the air in the heat exchanger after its discharge into the heat exchanger 98a is increased due to the longer path provided by the baffle. Thus, preheating of the air prior to its discharge into the combustion chamber 89a is assured. A plurality of discharge tubes 136a are tangentially disposed with respect to the primary combustion chamber and communicate with the channel 160 and the combustion chamber. The tubes 106a include the dampers and control system to provide proper amount of secondary air to assure maximum combustion temperatures. At its lower end, the channel 160 includes a discharge pipe 164 communicating with the preheater 70 to preheat the refuse in a manner similar to that explained heretofore.

An electronic control system can be associated with the system for measuring combustion temperatures, determine the amount of fuel necessary to meet the demand of the steam boilers and to control the flow of refuse particles to the incinerator. This electronic system can measure other desirable operating characteristics such as the moisture content of the fuel to control the amount of exhaust gases discharged to the rotary dryer 44, and the pressure in the combination chambers to control blowers 44 and/or 144a and maintain a constant negative pressure therein.

While in the foregoing a preferred embodiment of the invention has been described, it should be obvious to one skilled in the art that various modifications and changes can be made without departing from the true spirit and scope of the invention as recited in the appended claims.

I claim:

1. A method of utilizing refuse to provide useful heat energy comprising the steps of:
    separating glass, metals and other generally non-combustibles from refuse to provide a volume of generally combustible refuse;
    shredding the combustible refuse into relatively small particles;
    injecting a mixture of primary combustible air and the small particles of combustible refuse into a combustion chamber having a predetermined temperature and simultaneously separating the particles and imparting a cyclonic motion to the mixture whereby the particles ignite and are converted to combustion gases flowing through the combustion chamber;
    determining the temperature in said combustion chamber and controlling the flow of secondary combustion air to said combustion chamber in accordance with temperature changes therein to provide maximum combustion temperatures and substantially complete combustion of the particles and resultant combustion gases; and,
    maintaining a constant negative pressure in said combustion chamber to control the flow of the particles and gases whereby combustion gases are discharged from said combustion chamber.

2. A method in accordance with claim 1 including the step of discharging said combustion gases to a heat exchanger for using the heat energy thereof and therafter discharging said combustion gases to the atmosphere.

3. A method in accordance with claim 1, including the step of using the combustion gases to dry said refuse prior to injection into said combustion chamber.

4. A method in accordance with claim 3 including the step of returning some of said combustion gases used to dry said refuse and any combustibles therein to said combustion chamber and discharging the remaining combination gases to the atmosphere.

5. A method in accordance with claim 3 including first separation of said refuse prior to drying and second separation of said refuse subsequent to said drying, feeding combustible refuse in the volume of refuse separated in said first separation to storage bins and feeding combustible refuse in the volume of refuse separated in said second separation to said combustion chamber.

6. A method in accordance with claim 1 including the step of preheating the particles of combustible refuse and primary combustion air prior to injection into said combustion chamber.

7. A method in accordance with claim 1 wherein said primary combustion air comprises about ⅔ of the air required for burning said refuse at its maximum temperature.

8. A method in accordance with claim 1 including the step of preheating said secondary combustion air prior to its flow to said combustion chamber.

9. A method in accordance with claim 8 wherein secondary combustion air not required in said combustion chamber for burning said refuse at its maximum temperature is mixed with said particles of refuse and said primary combustion air to preheat said mixture.

10. A method in accordance with claim 1 including step of changing the flow of secondary combustion air in response to temperature changes in said combustion chamber.

11. A method in accordance with claim 10 wherein the most recent change in the flow of secondary air is determined and if the temperature in said combustion chamber has increased, continuing the most recent change and if the temperature in said combustion chamber has decreased, reversing the most recent change.

12. A method in accordance with claim 1 including the step of controlling the flow of said mixture to said combustion chamber in accordance with the heat requirement of an associated heat exchanger in communication with said combustion chamber.

13. A method in accordance with claim 1 including the step of feeding combustion gases from said combustion chamber to another combustion chamber such that said gases flow downwardly then upwardly therethrough causing non-combustibles to be separated therefrom.

14. A method in accordance with claim 1 including the step of feeding combustion gases from said combustion chamber through separators before discharging said gases to the atmosphere.

15. A method in accordance with claim 3 including the step of feeding refuse to said dryer in accordance with its moisture content.

16. A system for utilizing refuse to provide useful heat energy comprising:
  separating means for separating glass, metals and other generally non-combustibles from said refuse to provide a volume of generally combustible refuse;
  shredding means for shredding the generally combustible refuse into relatively small particles;
  incinerator means to which a mixture of said particles of refuse and air is fed, said incinerator means including a generally cylindrical combustion chamber and a tangentially disposed separating nozzle through which said mixture is fed whereby said particles are separated and mixed with said air and whereby said mixture enters said combustion chamber with a cyclonic motion;
  control means associated with said combustion chamber for maintaining the combustion temperature of the burning mixture in said chamber at its maximum,
  said control means including means for changing the amount of secondary combustion air fed to said combustion chamber in accordance with temperature changes therein; and,
  blower means for controlling the flow of said burning mixture such that combustion gases are discharged from said combustion chamber.

17. A system in accordance with claim 16 including means for controlling the flow of said mixture to said combustion chamber in accordance with the heat requirement of an associated heat exchanger in communication with said combustion chamber.

18. A system in accordance with claim 16 wherein said control means further includes temperature measuring means providing output signals representative of the temperature in said combustion chamber, means responsive to the temperature signals for providing output signals representative of changes in temperature and means responsive to said temperature change signals for adjusting the position of a flow control device moveable between open and closed positions to regulate the flow of secondary air.

19. A system in accordance with claim 18 wherein said means responsive to said temperature change signals is also responsive to signals representative of the movement of said flow control device toward said open or closed position such that air increase in temperature will continue said movement and a decrease in temperature will reverse the direction of said movement.

20. A system in accordance with claim 16 wherein said combustion chamber is provided with a plurality of said control means spaced along the flow path of said combustion gases through said combustion chamber whereby each of said control means is operative to change the amount of secondary air fed to a particular zone in said combustion chamber.

21. A system in accordance with claim 16 wherein said separating means includes dryer means for drying said refuse and wherein said dryer means communicates with said incinerator means whereby combustion gases from said incinerator dry said refuse.

22. A system in accordance with claim 16 wherein said separating nozzle is formed with a plurality of vanes forming separate channels through which said mixture is injected.

23. A system in accordance with claim 16 including heat exchanger means disposed concentrically about the axis of said combustion chamber for preheating secondary combustion air.

24. A system in accordance with claim 23 wherein said heat exchanger means is a generally cylindrical member centrally disposed within said combustion chamber.

25. A system in accordance with claim 23 wherein said heat exchanger means is disposed about said combustion chamber.

26. A system in accordance with claim 23 wherein said heat exchanger means communicates with refuse preheater for preheating said refuse prior to its injection into said combustion chamber.

27. A system in accordance with claim 21 wherein said dryer means communicates with an exhaust stack and said incinerator means whereby some of the gases used for drying are discharged to the atmosphere and the remainder of the gases including any combustibles are returned to said incinerator means.

28. A system in accordance with claim 16 wherein said incinerator means include a secondary combustion chamber communicating with said generally combustion chamber through a tangentially disposed conduit, said secondary combustion chamber comprising a first annular chamber surrounding a discharge stack and a second chamber adjacent the end of said discharge stack whereby gases flow downwardly through said annular chamber to said second chamber and upwardly through said discharge stack so that non-combustibles are separated from said gases.

29. An incinerator including a generally cylindrical member forming a combustion chamber, said combustion chamber being provided with refuse inlet means and combustion gas discharge means, said refuse inlet means comprising a nozzle tangentially disposed with respect to said combustion chamber and nozzle including a plurality of channels through which said refuse is discharged whereby said refuse is separated as it is discharged into said combustion chamber.

30. An incinerator in accordance with claim 29 including a second refuse inlet means similar to said first refuse inlet means and spaced 180° therefrom.

31. An incinerator in accordance with claim 29 including heat exchanger means centrally disposed within said combustion chamber, said heat exchanger means including an air inlet means adjacent said refuse inlet means and an air discharge means adjacent said combustion gas discharge means, said air discharge means communicating with a secondary air plenum extending around the outer periphery of said generally cylindrical member and being in communication with said combustion chamber.

32. An incinerator in accordance with claim 29 including heat exchanger means disposed about said combustion chamber, said heat exchanger means including an air inlet means adjacent said refuse inlet means and an air discharge means adjacent said combustion gas discharge means, and a baffle extending between said air inlet means and said air discharge means forming a spiral path about said combustion chamber.

33. An incinerator means in accordance with claim 29 wherein said combustion gas discharge means includes a tangentially disposed conduit tapering from a larger cross-sectional area adjacent said combustion chamber to a smaller cross-sectional area.

34. A combination combustion chamber and separator including a cylindrical portion, an adjacent frusto-conic portion and a discharge stack centrally disposed in said cylindrical portion and said discharge stack, said discharge stack being in communication with said frusto-conic portion, tangentially disposed inlet means formed in said cylindrical portion whereby gases flow in a cyclonic path downwardly through said annular chamber to said frusto-conic portion and then upwardly through said discharge stack, and means for admitting secondary combustion air to said frusto-conic portion.

35. A combination combustion chamber and separator in accordance with claim 34 including means at the lower end of said frusto-conic portion for removing non-combustibles settling from said combustion gases.

36. A method of controlling temperature in a refuse incinerator by changing the flow of secondary air thereto including the steps of:
measuring temperatures in said incinerator and determining whether the temperature is increasing or decreasing;
determining if the most recent change in flow of secondary air to said combustion chamber has been an increase or a decrease; and,
changing the flow of secondary air to said combustion chamber by continuing the most recent change if said temperature has increased or by reversing the most recent change if said temperature has decreased.

37. Apparatus for maintaining maximum temperature in an incinerator comprising means for changing the flow of secondary combustion air to said incinerator by increasing or decreasing said flow, means for providing a signal representative of the instantaneous temperature in said incinerator and means responsive to said temperature signal for determining if said temperature has increased or decreased, and for providing a signal representative of the change in temperature, means for providing a signal indicating whether the most recent change in the flow of secondary air has been an increase or a decrease and control means responsive to said change in temperature signal and said most recent change signal for actuating said means for changing the flow of secondary air to said incinerator.

38. Apparatus in accordance with claim 37 wherein said control means is operative to continue the most recent change in the flow of secondary air if said temperature has increased and to reverse the most recent change of said temperature has decreased.

39. An incinerator in accordance with claim 32 wherein said baffle is formed with a relatively small helix angle adjacent said air inlet means and a larger helix angle adjacent said air discharge means.

* * * * *

UNITED STATES PATENT OFFICE
CERTIFICATE OF CORRECTION

Patent No. 4,015,546            Dated April 5, 1977

Inventor(s)    EUGENE H. PAULES

It is certified that error appears in the above-identified patent and that said Letters Patent are hereby corrected as shown below:

In the Abstract - line 5, a space should be between the words "shredding" and "the".

Column 2, line 61, after "combustion" insert --chamber--.

Column 6, line 50, "98" should be --89--.

Column 8, line 60, "144" should be --114--.

Column 9, line 12, "135" should be --134--.

Column 11, line 49, "44" should be --144--.

Claim 29, line 6, "and" should be --said--.

Signed and Sealed this

Fourteenth Day of June 1977

[SEAL]

Attest:

RUTH C. MASON
Attesting Officer

C. MARSHALL DANN
Commissioner of Patents and Trademarks